Jan. 25, 1966  A. J. CLARK  3,230,780
AUTOMATIC TUNING MECHANISM
Filed March 21, 1963
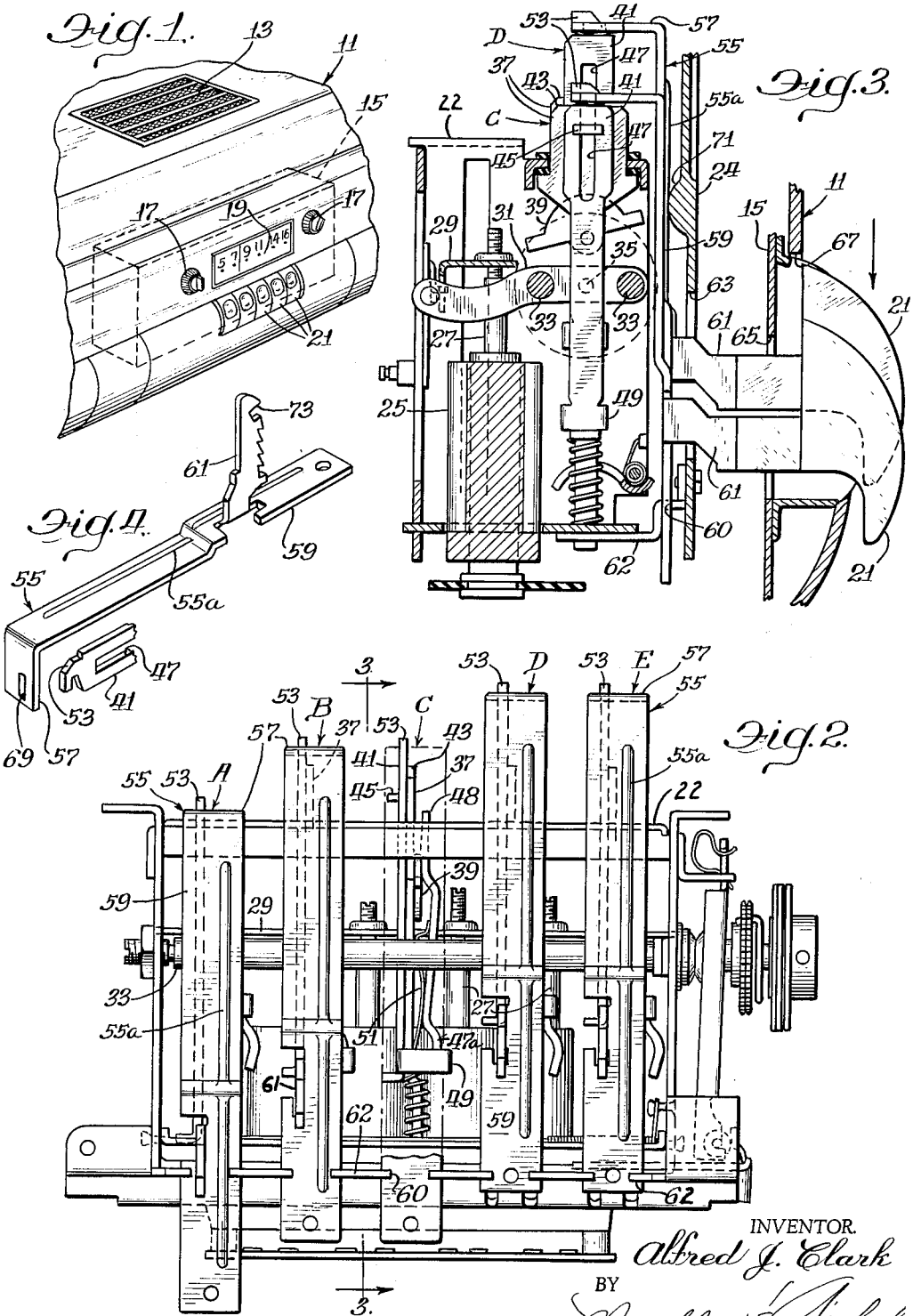
INVENTOR.
Alfred J. Clark
BY
Mueller & Aichele
Attys.

United States Patent Office 3,230,780
Patented Jan. 25, 1966

3,230,780
AUTOMATIC TUNING MECHANISM
Alfred J. Clark, Palatine, Ill., assignor to Motorola, Inc., Franklin Park, Ill., a corporation of Illinois
Filed Mar. 21, 1963, Ser. No. 266,905
6 Claims. (Cl. 74—10.29)

This invention relates to tuners for wave signal apparatus, and more particularly to a pushbutton operated mechanism for such a tuner.

Pushbutton operated tuners are in prevalent use in radio receivers for passenger automobiles. Such tuners facilitate station changing for the driver of the automobile with a minimum of distraction. Space is very often an important consideration in designing such a radio, depending upon the particular configuration of the dash panel of the automobile. Most pushbutton radios include a plurality of push-to-lock type key slides, each of which has a cam mounted thereon which may be locked or unlocked by linear displacement of the slide inwardly or outwardly from the normal position. The position of the cam determines the displacement of a treadle bar mechanism, which in turn varies the values of reactance tuning elements. Tuner key slides such as the above described must be relatively long, and are linearly displaceable in the same direction as their length by pushbuttons directly secured to their ends. This requires a space behind the dash panel of substantial depth. In certain types of automobiles the required depth is not available to permit mounting the key slides for horizontal movement.

Accordingly, it is an object of this invention to provide an improved pushbutton tuner mechanism for automobile radio receivers.

A further object of the invention is to provide a pushbutton operated wave signal tuner with a minimum depth dimension.

Another object of the invention is to provide a pushbutton tuner mechanism wherein the push-to-lock type key slides therein may be disposed generally vertically.

A feature of the invention is the provision of a pushbutton tuner mechanism wherein the key slides are positioned vertically, and the pushbutton stems or arms extend perpendicularly of the key slides.

A further feature of the invention is the provision, in a tuner mechanism having a plurality of key slides, of a linearly displaceable actuator link fixed to each key slide, with each link having a manually displaceable pushbutton arm extending substantially perpendicularly therefrom.

Another feature of the invention is the provision, in a tuner mechanism of the above described type, of an actuator link which is substantially L-shaped, with a short segment thereof attached to the key slide and a long segment thereof extending parallel with the key slide and guided by the tuner frame.

Referring now to the drawing:

FIG. 1, is a schematic diagram of a portion of the dash panel of an automobile having a radio incorporating the invention mounted therein;

FIG. 2, is a top plan view of a pushbutton tuner mechanism constructed in accordance with the invention;

FIG. 3, is a sectional view taken along the line 3—3 of FIG. 2; and

FIG. 4, is a perspective view of a part incorporated in the invention.

In accordance with the invention, a radio receiver having a pushbutton tuner mechanism which includes a plurality of key slides of the push-to-lock type, is disposed behind the dash panel of an automobile such that the key slides extend vertically. Each key slide is provided with a substantially L-shaped actuator link which has a short segment fixed to the operating end of the key slide and a long segment extending substantially parallel with each key slide along the front of the receiver. Each actuator link contains an arm which extends substantially perpendicularly thereof through the front of the receiver and through the dash panel of the automobile. A pushbutton is fixed on the end of each arm, and may be pushed downward to cause linear displacement of the actuating link, and hence of the key slide, for tuning the receiver. The pushbutton may also be displaced upwardly to cause the actuating link to unlock the key slide, for presetting of the adjustable cam member thereon.

Referring now to FIG. 1, a portion of the dash panel 11 of an automobile is shown in perspective. The top of dash panel 11 contains a grid 13 behind which a loud speaker may be mounted. A radio receiver 15 is shown mounted behind dash panel 11, and includes control knobs 17, indicator dial 19 and a plurality of pushbuttons 21.

In FIGS. 2 and 3 the construction of the tuner mechanism of the invention is shown. A tuner frame 22 is mounted to the front of radio receiver 15 and contains a plurality of tuning coils 25. Each of coils 25 has a movable core 27 which is attached to a tuning carriage 29. Tuning carriage 29 is displaceable by means of a treadle bar arrangement which includes a pivotal actuating arm 31 at each end of the tuner, and a pair of transverse treadle bars 33 fixed at their ends to arms 31 on opposite sides of the pivot points 35 therefor. A plurality of key slides 37, designated A, B, C, D, and E for clarity, are mounted on the tuner and will be explained in detail subsequently. Each key slide 37 contains a cam member 39 thereon and when key slide 37 is depressed to bring cam member 39 into engagement with transverse rods 33, members 31 will be pivoted until bars 33 align themselves with cam 39. This moves tuning carriage 29, and hence cores 27, to a predetermined position according to the position of cam 39.

The key slide 37 farthest to the left in FIG. 2, key slide A, is shown in depressed position wherein cam 39 engages treadle bars 33. The next two key slides B and C are shown in normal position, and the last two key slides D and E are shown in unlocked position.

Key slides 37 are comprised of a slide bar 41 fastened to a guide bar 43 by means of a T projection 45 which fits in slot 47. Cam 39 is mounted on a pivot on bar 43 and is held in locked position by a locking bar 48 which is clamped by a locking portion 49 on bar 41. Bias is provided by a leaf spring 51. Key slides of this general nature are known in the art, as may be evidenced by Patent No. 2,793,531 issued to R. E. Thompson and assigned to the assignee of the present invention.

Bar 41 is provided with a hook extension 53 thereon to which an L-shaped actuating link 55 is attached. Link 55 comprises a short segment 57 which is fastened to bar 53, and a long segment 59 which extends substantially parallel with key slide 37 on the front side of the tuner. Links 55 are guided by notches 60 in guide bracket 62 mounted to tuner frame 22 and are individually linearly displaceable to slide bars 41 up or down. It will be apparent that downward displacement of a link 55 will cause bar 41 to displace the entire associated key slide to the position of the farthest left slide of FIG. 2, with cam 39 engaging the treadle bars 33. Link 55 may also be displaced upwardly to cause locking extension 49 to move off of hump 47a and unlock bar 48 from cam 39. When in unlocked position, the key slides will appear as in the farthest right two slides of FIG. 2. Cam 39 may be reset by depressing key slide downward until the unlocked cam engages the treadle bar as positioned. Further depression of the key slide will lock the cam in the position taken by causing locking extension 49 to move over hump 47a, and lock bar 48 on cam 39.

Each of links 55 is provided with a pushbutton arm 61 extending substantially perpendicularly to the long segment 59 of link 55. Arms 61 extend through openings 63 in tuner front plate 24 and through openings 65 in the front of radio receiver 15, and finally, through an opening 67 in dash panel 11 of the automobile. Pushbuttons 21 are fastened to the ends of pushbutton arms 61 and are movable in the vertical direction to tune or unlock as may be desired.

Referring now to FIG. 4, the detail of link 55 may be more clearly seen. A notch 69 is formed in short segment 57 of link 55 and the hook portion 53 of bar 41 extends therethrough to secure link 55 to bar 41. A ridge 55a extends along part of link 55 and bears on a raised portion 71 on the inner surface of tuner front plate 24 (see FIG. 3). Pushbutton arm 61 extends outwardly from the long segment of link 55 and contains a notch 73 for securing a pushbutton thereto.

As may be seen from the foregoing description taken in connection with the drawings, the invention provides an improved pushbutton tuner mechanism for wave signal apparatus wherein push-to-lock key slides are mounted in a vertical position. In certain applications, such a configuration can save considerable space while providing secure, reliable operation. The mechanism may be unlocked to set the positioning cam as desired, and a neat attractive outward appearance is maintained.

What is claimed is:

1. A pushbutton actuated tuner mechanism for operating a wave signal tuner, including in combination, a plurality of linearly displaceable actuator slides having means attached thereto for varying the position of a tuner element, a plurality of linearly displaceable actuator links, one fixed to each of said actuator slides for displacing the same, and a plurality of arms, one freely extending perpendicularly from each of said actuator links and being rigidly attached thereto to provide a driving connection, each of said arms being manually displaceable in a linear direction by force applied perpendicularly thereto, displacement of said arms causing linear displacement of said actuator links and said actuator slides to control the position of the tuner element.

2. A pushbutton actuated tuner mechanism for operating a wave signal tuner, including in combination, a plurality of linearly displaceable actuator slides of the push-to-lock type and having cam means attached thereto for varying the position of a tuning element, a plurality of linearly displaceable actuator links, one fixed to each of said actuator slides for displacing the same, and a plurality of pushbutton arms, one freely extending perpendicularly from each of said actuator links and being rigidly attached thereto to provide a driving connection, each of said arms being manually displaceable in a linear direction by force applied perpendicularly thereto, displacement of said arms causing linear displacement of said actuator links and said actuator slides to vary the position of the tuning element.

3. A pushbutton actuated tuner mechanism for operating a wave signal tuner, including in combination, a plurality of linearly displaceable push-to-lock key slides having cam means attached thereto for varying the position of a tuning element, a plurality of linearly displaceable substantially L-shaped actuator links, one fixed to each of said key slides for displacing the same, and a plurality of pushbutton arms, one extending perpendicularly from each of said actuator links and fixed thereto to provide a driving connection, each of said arms being manually displaceable by force applied perpendicularly thereto, displacement of said arms causing linear displacement of said actuator links and said key slides to vary the position of the tuning element and to lock and unlock said key slides.

4. A pushbutton actuated tuner mechanism for operating a wave signal tuner, including in combination, a plurality of linearly displaceable push-to-lock key slides having cam means attached thereto for varying the position of a tuning element, a plurality of linearly displaceable substantially L-shaped actuator links, each having a short segment attached to a respective one of said key slides and a long segment extending substantially parallel with and adjacent to said one key slide, and a plurality of pushbutton arms, one extending perpendicularly from each of said actuator links and fixed thereto to provide a driving connection, each of said arms being manually displaceable by force applied perpendicularly thereto, displacement of said arms causing linear displacement of said actuator links and said actuator slides to vary the position of the tuning element and to lock and unlock said key slides.

5. A pushbutton actuated tuner mechanism for operating a tuner in wave signal apparatus, including in combination, a plurality of linearly displaceable push-to-lock key slides having cam means attached thereto, treadle means for varying the inductance of the tuner positioned to be engaged by said cam means, a plurality of substantially L-shaped linearly displaceable actuator links, each having a short segment attached to a respective one of said key slides and a long segment extending substantially parallel with and adjacent to said one key slide, guide means for guiding said actuator links, and a plurality of pushbutton arms, one extending perpendicularly from each of said actuator links and fixed thereto to provide a driving connection, each of said arms being manually displaceable by force applied perpendicularly thereto, displacement of said arms causing linear displacement of said actuator links and said key slides to control the position of said treadle means and to lock and unlock said key slides.

6. A pushbutton actuated tuner mechanism for operating a tuner in wave signal apparatus, including in combination, a frame structure, a plurality of tuning coils each having a movable core associated therewith and mounted in said frame structure, movable treadle means coupled to said movable cores for varying the inductance of said tuning coils, a plurality of linearly displaceable push-to-lock key slides having cam means attached thereto engageable with said treadle means for moving the same, a plurality of substantially L-shaped linearly displaceable actuator links, each having a short segment attached to a respective one of said key slides and a long segment extending substantially parallel with and adjacent to said one key slide, guide slots in said frame structure for guiding said actuator links, and a plurality of pushbutton arms, one extending perpendicularly from each of said actuator links and fixed thereto to provide a driving connection, each of said arms being manually displaceable by force applied perpendicularly thereto, displacement of said arms causing linear displacement of said actuator links and said key slides to control the position of said treadle means and to lock and unlock said key slides.

References Cited by the Examiner
UNITED STATES PATENTS

| | | | |
|---|---|---|---|
| 957,624 | 5/1910 | Paul | 74—10.29 X |
| 2,281,093 | 4/1942 | Benton et al. | 74—10.29 |
| 2,285,247 | 6/1942 | Zepp | 74—10.37 |
| 2,356,935 | 8/1944 | Koch | 74—10.27 X |

BROUGHTON G. DURHAM, *Primary Examiner.*